United States Patent [19]

Underdown et al.

[11] 4,443,347
[45] Apr. 17, 1984

[54] PROPPANT CHARGE AND METHOD

[75] Inventors: David R. Underdown, Alvin; O. Howard Glaze, Kingwood, both of Tex.

[73] Assignee: Baker Oil Tools, Inc., Houston, Tex.

[21] Appl. No.: 494,548

[22] Filed: May 13, 1983

Related U.S. Application Data

[63] Continuation-in-part of Ser. No. 327,002, Dec. 3, 1981.

[51] Int. Cl.$^3$ .................. C09K 3/00; E21B 43/267
[52] U.S. Cl. .................. 252/8.55 R; 166/280; 427/221
[58] Field of Search .................. 252/8.55 R; 166/280; 427/221, 222

[56] References Cited

U.S. PATENT DOCUMENTS

| | | | |
|---|---|---|---|
| 2,650,195 | 8/1953 | Cardwell et al. | 252/8.5 LC |
| 2,993,871 | 7/1961 | Shannon et al. | 260/2.5 |
| 3,081,269 | 3/1963 | Shannon et al. | 260/2.5 |
| 3,089,542 | 5/1963 | Kolodny | 166/280 |
| 3,209,826 | 10/1965 | Young | 166/280 |
| 3,274,046 | 9/1966 | Shannon et al. | 161/36 |
| 3,650,814 | 3/1972 | Elder, Jr. | 427/221 |
| 3,929,191 | 12/1975 | Graham et al. | 166/276 |
| 3,935,339 | 1/1976 | Cooke, Jr. | 427/221 |
| 4,068,718 | 1/1978 | Cooke, Jr. et al. | 166/280 |
| 4,234,632 | 11/1980 | Lubowitz | 427/221 |
| 4,259,205 | 3/1981 | Murphey | 252/8.55 R |
| 4,291,766 | 9/1981 | Davies et al. | 166/280 |

OTHER PUBLICATIONS

Underdown, et al., 1982, New Proppant for Deep Hydraulic Fracturing, SPE 10889.
Sinclair, et al., 1977, A New Proppant to Sustain Fracture Conductivity and Maximize Stimulated Production, Maurer Engineering, Inc., Houston, Texas.

Primary Examiner—Benjamin R. Padgett
Assistant Examiner—Howard J. Locker
Attorney, Agent, or Firm—Norveil & Associates

[57] ABSTRACT

A method is provided for propping a fracture in a subterranean formation which comprises injecting into a subterranean well a suspension in a carrier fluid of a pre-cured proppant charge, the pre-cured proppant charge being pre-cured prior to injection into the well, and comprising prior to injection into the well, resin coated sand particles most of which are composed of a single substrate particle with a thermoset resite coating thereon, the resite coating being one which, when it is the resin coating on sand particles of a proppant charge, produces a charge wherein at least one of: (a) the Conductivity Ratio thereof, throughout a given closure stress range, is greater than that of a charge of the uncoated sand particles having substantially the same particle size distribution; or (b) the Permeability Ratio thereof, throughout the stress range of about 2,000 to about 10,000 p.s.i., is at least about 30 perecnt that of a sintered bauxite charge of substantially the same particle size, the resin for the coating being at least one of: (1) a resole; or (2) a novolac.

1 Claim, 2 Drawing Figures

PROPPANT CHARGE AND METHOD

REFERENCE TO RELATED APPLICATION

This is a continuation-in-part of application Ser. No. 327,002, filed Dec. 3, 1981, and assigned to the same assignee as the present invention.

DEFINITIONS

As used herein:

(1) The terms "percent" and "parts" refer to percent and part by weight, unless otherwise indicated.

(2) The term "resole" refers to a resin product of the partial condensation of a phenol with an aldehyde in such proportions that the partial condensate is capable of further condensation to an infusible or thermoset condition. Resoles can be either soluble or dispersible in water if condensation is stopped at an early stage or they can be essentially water-insoluble solids most often used in powdered condition. Inherently, resoles are fusible in the sense that, when heated to a sufficiently high temperature, they soften and will resolidify upon cooling; however, resoles are capable of undergoing further condensation when heated to a temperature sufficiently high that they fuse, particularly under either acid or alkaline conditions, so that they tend to undergo change when heated to fusion. Resoles are, most often, produced by the alkaline condensation of unsubstituted phenol (hydroxy benzene) with formaldehyde. The mole ratio of formaldehyde to phenol usually ranges from about 1.1:1 to about 1.5:1. The condensation is most often carried out in the presence of a fixed alkali, for example sodium hydroxide, calcium hydroxide or barium hydroxide and at a number of different temperatures, usually all in excess of about 100° F. The chemical and physical properties of a resole can be varied within substantial limits, usually depending upon such factors as the mole ratio of aldehyde to phenol, the nature of the condensation reaction, what is done with the fixed alkali after completion of the condensation and the nature and proportion of any chemical additive that is present.

(3) The term "resite" refers to an infusible or thermoset resin material produced by the further condensation of a resole.

(4) The term "novolac" refers to the resin products of the substantially complete condensation of a phenol with an aldehyde in such proportions that condensation is not capable of proceeding to form an infusible product. Novolacs are usually produced by the condensation of unsubstituted phenol with formaldehyde in approximately equimolecular proportions, often with a slight excess of phenol. A novolac is fusible and, since it does not contain a sufficiently high proportion of formaldehyde to enable condensation to a thermoset condition, it can be heated to fusion and then resolidified repeatedly without undergoing chemical change. A novolac can be mixed with hexamethylenetetraamine, or another formaldehyde-donor, e.g., paraformaldehyde or a resole, and the mixture can then be condensed to a thermoset, or infusible, condition.

(5) "Conductivity" is the permeability in Darcies or other suitable units multiplied by the fracture width measured in feet or other suitable units.

(6) The phrase "closure stress" refers to a force, read in pounds per square inch, applied to a given surface.

(7) The "conductivity ratio" of a proppant material is its conductivity, usually measured in Darcy-feet, at a given closure stress divided by its conductivity, determined by the same test procedure, measured in the same units and at the same closure stress.

(8) "Sand" is a natural material, generally comprising quartz.

(9) The phrases "pre-cured" and "pre-cured proppant charge" refers to particles which have been substantially coated with a resin and the resin thereon cured to completion prior to introduction of the charge into a subterranean well.

BACKGROUND OF THE INVENTION

1. Field of the Invention

This invention relates to a proppant, to a method for producing the proppant, and to a method for propping a subterranean well with the proppant. Various particulate materials, including sand, glass spheres, bauxite and various substrates coated with a fusible thermosetting resin have been suggested for use as proppants. Such use involves, for example, injecting a fluid into a well to form a fracture in a subterranean formation which the well penetrates and injecting a proppant suspended in a carrier fluid into the formation. The proppant, when so injected, is deposited in the fracture to "prop" the adjacent walls apart so that the fracture is not closed by the forces which are extant in the subterranean formation.

2. Description of the Prior Art

In general, siliceous sand, because it is widely available, inexpensive, and comparatively effective, is an ideal proppant, at least for use in comparatively shallow formations. It has been found, however, that sand is not a desirable proppant when used in formations sufficiently deep that the fracture is subjected to closure stresses exceeding about 5,000 p.s.i.. At greater stresses, it is believed, the sand particles are disintegrated, forming fines which then plug the formation, reducing its permeability. This is discussed in U.S. Pat. No. 3,929,191, granted Dec. 20, 1975, to Graham, et al.

Sintered bauxite has also been suggested as a proppant, and is preferable to siliceous sand because of its ability to withstand higher stresses without disintegration. However, sintered bauxite is less desirable than siliceous sand as a proppant because it is substantially more expensive and is less generally available. The use of sintered bauxite as a proppant is disclosed in U.S. Pat. No. 4,068,718, granted Jan. 17, 1978, to Cook, Jr., et al.

The previously identified Graham, et al. patent also discloses the use, as a proppant, of sand coated with "a powdered phenol formaldehyde resin sold by Union Carbide Corporation under the tradename BRPE 4035 one-step, thermosettable phenolic resin". When sand coated with the "powdered phenol formaldehyde resin" is placed in a subterranean formation, the Graham, et al, patent indicates, the heat of the formation causes the resin coating to melt and, ultimately, to cure; while the coating is melted, coalescence occurs between the coatings on adjacent particles so that, after cure of the resin coating, many sand particles are bonded together thereby. The Graham, et al. patent also indicates that various substrates, particularly glass beads, coated with thermosettable resins, are also suitable proppants, but that substrates, specifically sand, coated with the BRPE 4035 material and "pre-cured" are actually less advantageous than the uncoated substrates.

As has been indicated above, the function of a proppant is to "prop" the walls adjacent a fracture in a subterranean formation apart so that the fracture is not closed by the forces which are extent in the formation. It is advantageous for the walls adjacent the fracture to be "propped" apart so that the formation can be worked, usually to remove oil or natural gas. It will be appreciated that the coalescence which occurs after the Graham, et al. coated particles are placed, as described above, reduces the porosity within the fracture, correspondingly interfering with the ultimate working of the well. It has also been found that before sand cures to a thermoset condition, sand and other particulate materials present in the subterranean formation can contaminate the proppant by adhering to the sand coated with the resin, still further reducing porosity and often constituting the weakest links in the proppant "chain", collapsing and breaking into smaller particles under pressures which the proppant, if not contaminated, could withstand without deteriment. It has been found that this latter phenomenon causes fractures propped with particulate matter coated with a fusible, synthetic resin to become plugged much sooner than would be predicted on the basis of permeability measurements made at various applied stresses in a comparatively clean environment. It has also been found that the BRPE 4035 material is a blend of ⅓ part of a resole and ⅔ part of a novolac, and not the simple "one step, thermosettable phenolic resin" it is characterized by said Graham, et al. patent as being.

SUMMARY OF THE INVENTION

The present invention relates to a pre-cured proppant charge which is utilized for propping a fracture within a subterranean well, such as oil or gas well. The proppant comprises resin coated particles most of which are composed of a single substraight particle having a thermoset resin coating thereon. The coating is one which, when it is the resin coating on the particles of the proppant charge, produces a charge where the Conductivity Ratio throughout a given closure stress range is greater than that of a charge of the uncoated particles having substantially the same particle size distribution.

A method for producing the pre-cured proppant charge also is contemplated. The particulate substraight is coated with from about 3% to about 8% of a thermal settable resin, by weight based upon the total of substraight and resin, and an effective amount of a coupling agent. The coating step is controlled so that substraight particles coated with a fusible thermosetting resin are produced. The resin coating is cured to a thermal set condition by heating the coated substraight particle, with agitation, and breaking up agglomerates which formed during the heating, as required, to produce resin coated particles.

DESCRIPTION OF THE PREFERRED EMBODIMENTS

Figure 1:
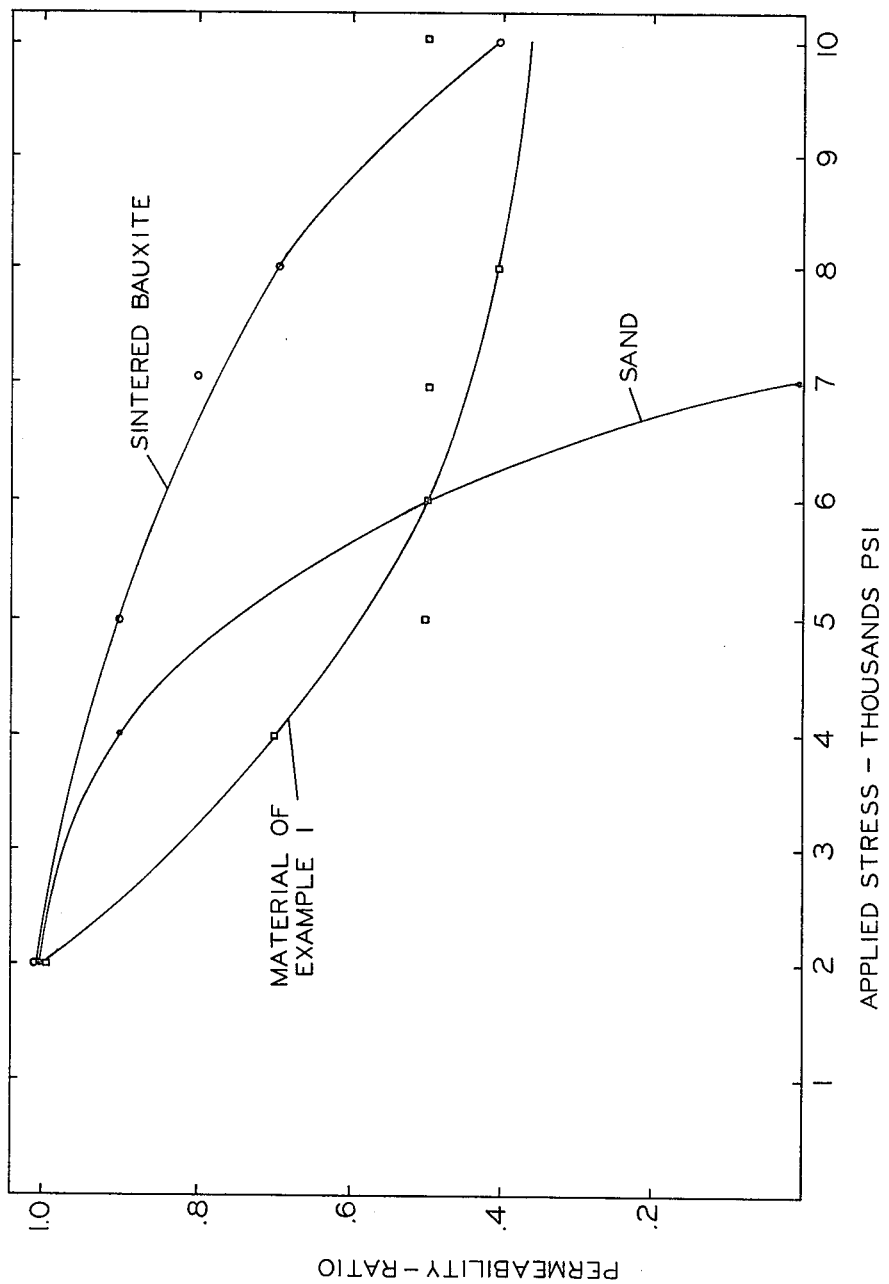
FIG. 1 is a plot of Permeability Ratio against applied stress for three different proppant materials: (1) a proppant charge according to a specific embodiment of the present invention comprising a large number of resin coated sand particles most of which are composed of a single sand particle with a cured phenolic resin coating thereon, (2) sand and (3) sintered bauxite.

The following Examples, which are presented solely for the purpose of further illustrating and disclosing the invention, are not to be construed as limiting. Example 4 constitutes the best presently contemplated mode of carrying out the invention.

EXAMPLE 1

A proppant charge was produced from 200 parts monocrystalline silica sand, 10 parts phenolic resin and 1 part gama-aminopropyltriethoxysilane. Substantially all of the sand was minus 20 plus 40 mesh, U.S. Sieve Series, in size. The phenol formaldehyde resin was one which is available in dry, powdered condition from Union Carbide Corporation under the trade designation BRPE 4035. The sand was charged to a metal receptacle; one surface of the receptacle was heated to a temperature of substantially 270° F. for 14 hours after which time the sand was found to have reached a temperature of 268° F., plus or minus 5° F. Heating of the sand was then discontinued; the resole and the gamma-aminopropyltriethoxysilane were charged to the metal container and the sand-resin-silane charge was mixed with vigor until the charge cooled to ambient temperature of about 75° F. The cooling required approximately four minutes. A surface of the metal container with the cool charge therein was then heated to about 350° F. and the charge was stirred gently until large clumps which formed made stirring difficult. The large clumps formed about five minutes after heating was commenced. The charge was then removed from the metal vessel and the clumps composed of agglomerated particles were broken until the charge was free flowing and appear to consist of individual sand particles coated with the phenol-formaldehyde resin. The steps of heating the charge with moderate stirring until lumps formed and of breaking the lumps were repeated until the originally yellow phenol-formaldehyde resin changed to a dark brown color. There were approximately five cycles of heating and breaking.

The suitability for use as a proppant of the precured resin-coated sand particles produced as described in the preceding paragraph was tested by determining permeability as a function of stress for the material by a procedure similar to that described in "Conductivity of Fracture Proppants in Multiple Layers", Cooke, Jr., et al. *Journal of Petroleum Technology*, September, 1973, pages 1101–1107. To determine permeability as a function of stress a cylindrical tube of flexible sheet material was packed with the proppant produced as described in the preceding paragraph; the ends of the tube were closed with 200 mesh, U.S. Sieve Series, screening; the tube was placed in a core; and flow therethrough under a constant pressure head of substantially one atmosphere were determined at various stresses applied by hydrostatic pressure acting on the proppant through the core. Permeability Ratios are presented in Table I, below, for various stresses:

TABLE I

| APPLIED STRESS, P.S.I. | PERMEABILITY RATIO |
|---|---|
| 2,000 | 1.0 |
| 4,000 | 0.7 |
| 5,000 | 0.5 |
| 6,000 | 0.5 |
| 7,000 | 0.5 |
| 8,000 | 0.4 |

TABLE I-continued

| APPLIED STRESS, P.S.I. | PERMEABILITY RATIO |
|---|---|
| 10,000 | 0.5 |

For purposes of comparison, but not in accordance with the instant invention, the uncoated, siliceous sand used as described above in Example 1 was subjected to the above described flow test and Permeability Ratios were calculated. The calculated Permeability Ratios are presented in Table II, below, for three different stresses:

TABLE II

| APPLIED STRESS, P.S.I. | PERMEABILITY RATIO |
|---|---|
| 2,000 | 1.0 |
| 4,000 | 0.9 |
| 6,000 | 0.5 |
| 7,000 and above | 0.0 |

There was no flow through the sand in the test cell at applied stresses of 7,000 p.s.i. and above. It will be noted that the previously identified Graham, et al. patent, FIG. 8, discloses that sand coated with a one-step pre-cured phenolic resin has an even lower permeability than does uncoated sand.

The flow at various applied stresses was also determined for sintered bauxit, and Permeability Ratios were calculated. The bauxite was minus 20 plus 40 mesh, U.S. Sieve Series, in size. The calculated Permeability Ratios for the sintered bauxite are presented in Table III, below, for several different applied stresses:

TABLE III

| APPLIED STRESS, P.S.I. | PERMEABILITY RATIO |
|---|---|
| 2,000 | 1.0 |
| 4,000 | 0.9 |
| 5,000 | 0.9 |
| 7,000 | 0.8 |
| 8,000 | 0.7 |
| 10,000 | 0.4 |

The data of Tables I, II and III are presented graphically in FIG. 1 of the attached drawings.

EXAMPLE 2

A proppant charge was also produced from the materials identified in Example I, in the proportions there recited, using a slightly different manipulative procedure. The silica sand, after having been preheated to 400° F., was charged to a bladed mixer under ambient conditions of about 70° F. and allowed to cool, with the mixer in operation. When the sand reached a temperature of 200° F., the phenolic resin and the gamma-aminopropyltriethoxysilane were charged to the mixer; when the charge in the mixer cooled to about 80° F., mixing was discontinued and the charge, which was composed predominately of individual sand particles coated with the phenolic resin, was screened into three size fractions, plus 20 mesh, minus 20 mesh plus 40 mesh, and minus 40 mesh, U.S. Sieve Series. The minus 20 plus 40 mesh material was poured onto a surface heated to a temperature of 560° to 580° F., and left thereon for a period of substantially 10 seconds to effect cure of the phenolic resin coating. To determine the conductivity as a function of closure stress, the coated and cured siliceous sand was subjected to a flow test, the general procedure for which is proposed by the API Task Group on Conductivity Testing of Proppant Materials. The test procedure involves use of a linear test cell design with approximately 10 square inches test area. The pistons and test chamber are constructed of 316 stainless steel. In this test a closure stress is applied across the test cell for sufficient time to allow the proppant to reach a semi-steady state condition. Test fluid is forced through the proppant bed to measure fracture conductivity. Three different flow rates are tested at each closure stress; a plot of the data shows if flow rates are under laminar or turbulent flow. Only data run under laminar flow will be reported in this procedure. After running the third flow rate, the closure stress is increased to a higher stress, time is allowed to reach a semi-steady state condition at the higher stress level and three flow rates are again made to determine the conductivity at the higher stress; the conductivity in mili-Darcy-feet and conductivity ratio were then calculated for each of the closure stresses. The calculated conductivities and conductivity ratios are presented in Table IV, below.

TABLE IV

| CLOSURE STRESS, P.S.I. | CONDUCTIVITY (MD-FT) | CONDUCTIVITY RATIO |
|---|---|---|
| 2,000 | 2,320 | 1 |
| 4,000 | 2,040 | 0.88 |
| 6,000 | 1,710 | 0.74 |
| 8,000 | 1,510 | 0.65 |
| 10,000 | 1,330 | 0.57 |
| 12,000 | 1,070 | 0.46 |
| 14,000 | 910 | 0.39 |

EXAMPLES 3-5

The procedure described in Example 2 was repeated except that the phenolic resin which is available under the trade designation BRPE 4035 was replaced by 10 parts of three different phenolic resins. In Example 3, the resin used was one which is available from Georgia-Pacific Corp. under the trade designation GP-2155; in Example IV, the resin was one available from Georgia-Pacific Corp. under the designation GP-2CL; in Example V, the resin was one which is available from Borden, Inc., under the designation B-CF. Conductivity ratios, determined from flow data at various closure stresses for the proppants produced as described in Examples 3, 4, and 5 are presented in Table V, below:

TABLE V

| CLOSURE STRESS, P.S.I. | CONDUCTIVITY (MD-FT) | | | CONDUCTIVITY RATIO | | |
|---|---|---|---|---|---|---|
| | Ex. 3 | Ex. 4 | Ex. 5 | Ex. 3 | Ex. 4 | Ex. 5 |
| 2,000 | 3,330 | 2,420 | 2,580 | 1 | 1 | 1 |
| 4,000 | 2,810 | 2,120 | 1,960 | 0.84 | 0.88 | 0.76 |
| 6,000 | 2,440 | 1,850 | 1,560 | 0.73 | 0.76 | 0.64 |
| 8,000 | 2,090 | 1,630 | 1,420 | 0.63 | 0.67 | 0.55 |
| 10,000 | 1,710 | 1,410 | 1,140 | 0.51 | 0.58 | 0.44 |
| 12,000 | 1,320 | 1,200 | 950 | 0.40 | 0.50 | 0.37 |
| 14,000 | 1,030 | 1,090 | 770 | 0.31 | 0.45 | 0.30 |

Figure 2:
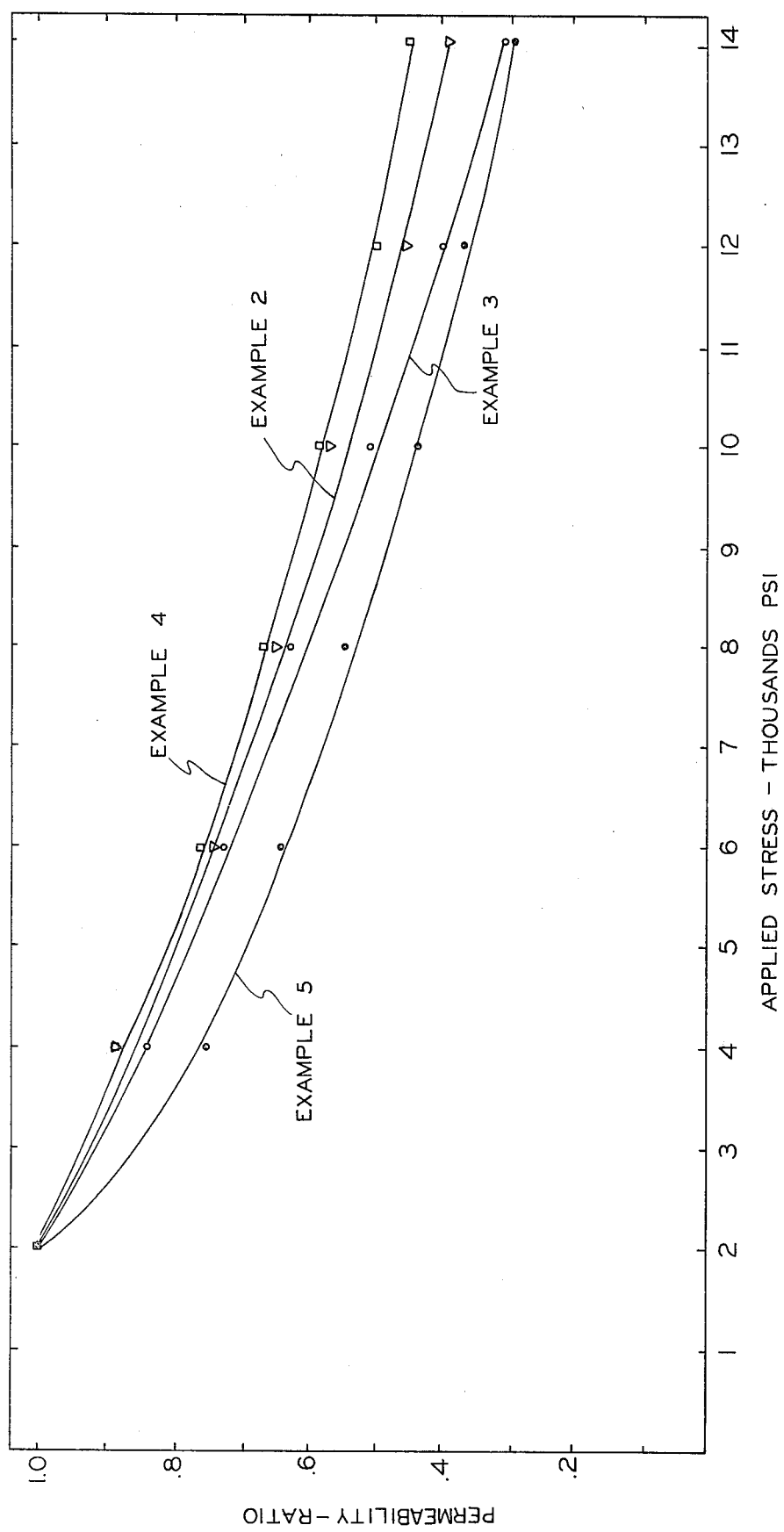
FIG. 2 is a plot similar to FIG. 1 for four different proppant materials according to the invention.

The Conductivity Ratio data of Table IV and V are plotted in FIG. 2 of the drawings. The GP-2155 resin which was used in the procedure described as Example 3 is a blend of an acid catalyzed novolac, mole ratio of formaldehyde to phenol slightly less that 1:1, and hexamethylenetetraamine, substantially 9% of the total. The GP-2CL resin which was used in the procedure described as Example 4 is a blend of ⅓ part of a resole and ⅔ part of a novolac.

The procedure of Example 2, above, was also used to produce proppant charges from other blends of the novolac of the GP-2155 material with varying amounts of hexamenthylenetetraamine. Each of the proppants so produced was then tested to determine the percentage of fines and percent of crosslinking in the phenolic resin coating. The test described in Section 8 of API RP 56, First Edition, March, 1983, was used to determine percent of fines. API RP 56 is a publication of the American Petroleum Institute, Washington, D.C. 20037, entitled "API Recommended Practices For Testing Sand Used In Hydraulic Fracturing Operations". The sieves used in determining the percent of fines were 20 mesh and 40 mesh, U.S. Sieve Series. The percent of hexamethylenetetraamine in each of the resin compositions used, based upon the weight of resin plus hexamethylenetetraamine, the percent of finds found and the percent of cross-linking are presented, for each of these proppants, in Table VI, below:

TABLE VI

| Preparation No. | Hexamethylene-tetraamine, Percent | Fines, Percent | Cross-Linking, Percent |
| --- | --- | --- | --- |
| 1 | 0 | 24.17 | 0 |
| 2 | 2 | 3.91 | 12.6 |
| 3 | 3 | 2.21 | 18.8 |
| 4 | 4 | 2.29 | 25.1 |
| 5 | 5 | 2.06 | 31.4 |
| 6 | 6 | 2.06 | 37.7 |
| 7 | 8 | 2.7 | 50.2 |
| 8 | 12 | 2.79 | 75.3 |
| 9 | 15 | 3.11 | 94.2 |

A statistical evaluation of the percent of fines data in Table VI, which are based upon many determinations, indicates that the standard deviation from the values reported, to the 95% confidence level, is 0.37. A second degree polynominal regression indicated minimum fines at 4.89% hexamethylenetetraamine.

Conductivity was also determined for proppants produced by the procedure described in Example 2 using a blend of the novolac which is available under the designation GP-2155 and varying amounts of hexamethylenetetraamine. Conductivity was found to vary as an inverse function of percent of fines, determined as described above, through the range of proportions covered by the data of Table VI.

Table VI shows that hexamethylenetetraamine content can vary substantially above or below the 4.89% at which minimum fines occurred without substantial increases in percent of fines. The 9% of hexamethylenetetraamine used in the preferred procedure of Example 3 was selected because it is on the high side of the range or proportions which gives near minimum fines; hexamethylenetetraamine is a comparatively light, powdery material, which is more likely than a phenolic resin to be lost during processing. As a consequence, the use of 9% of hexamethylenetetraamine with the particular novolac is preferred because the final composition, after processing losses, can reasonably be expected to be well within the composition range at which near optimum results are achieved.

The procedure of Example 3, above, has also been carried out using minus 20 plus 30 mesh, U.S. Sieve Series sand instead of the minus 20 plus 40 mesh sand of the Example 4 procedure. The coarser proppant which was produced gave higher conductivity as a consequence of its increased coarseness. Typical values of conductivity and of conductivity ratio for the coarser proppant are presented in Table VII below:

TABLE VII

| CLOSURE STRESS, P.S.I. | CONDUCTIVITY (MD-FT) | CONDUCTIVITY RATIO |
| --- | --- | --- |
| 2,000 | 4,912 | 1 |
| 4,000 | 4,876 | 0.82 |
| 6,000 | 3,582 | 0.60 |
| 8,000 | 3,166 | 0.53 |
| 10,000 | 2,390 | 0.40 |

The procedure described in Example 1 has been repeated, except that, in several instances, different commercially available powdered resoles were used and, in several instances, a blend of a commercially available phenol-formaldehyde novolac resin with hexamethylenetetraamine was used, in each instance in place of the phenolic resin of the Example 1 procedure. In each case, the cured resin coating which was produced on the sand, when subjected to the previously described stress test, crushed at a stress in excess of 3,000 p.s.i. but less than 10,000 p.s.i. to such an extent that the flow through the pressurized bed thereof was zero. In all cases, however, the stress required to crush the sand coated with the cured phenolic resin was greater than that required to crush the uncoated sand, so that coated sand, under the conditions extant in some formations, would perform better as a proppant than would the uncoated sand.

It will be appreciated from the foregoing discussion that the essence of the instant invention is a pre-cured proppant charge which can be suspended in a suitable liquid and pumped into a subterranean well, and that the charge comprises resin coated sand or other particles most of which are composed of a single substrate particle with a thermoset resin coating thereon. The coating, preferably, is a thermoset phenolic coating, and, in any event, is effective to increase the Conductivity Ratio, by comparison with that of a proppant charge made up of the uncoated substrate particles. In the embodiments of the Examples, the invention resides in the selection of the particular phenolic resins for use in producing a coated proppant, and in producing therewith a pre-cured proppant charge of resin-coated particles most of which are composed of a single substrate particle with a thermoset coating thereon formed by cure of the phenolic resin. Phenolic resin manufacturers are capable of determining the chemical identity of available phenolic resins and of producing resins or resin compositions having the same physical and chemical properties. For example, the resin which was used in the procedure described as Example 4, above, was produced by one manufacturer to duplicate the chemical and physical properties of the resin used in the procedures of Examples 1 and 2. Accordingly, to practice the procedure described in any of the examples hereof, it is necessary only to obtain the phenolic resin identified by trade designation in that example and to carry out the manipulative steps which are there described. Alternatively, a phenolic resin having substantially the physical and chemical properties of one of the resins identified by trade designation can be obtained from a different manufacturer, and used in practicing the procedure of the example in question. It is also possible to synthesize phenolic resins to have, when cured, the percentage of crosslinking at which minimum fines are produced by the test procedure described above. For example, a resole can be prepared by any desired condensation cycle at a plurality of phenol to formaldehyde mole ratios, and percent fines as a function of mole ratio determined. The optimum mole ratio is that which provides a minimum percentage of fines. Similarly, a given resole can be blended with a novolac to decrease the overall mole ratio of formaldehyde to phenol, or with hexamethylenetetraamine to increase this mole ratio, and the optimum mole ratio, namely the one which provides the minimum of fines by the procedure described above, can be determined.

It will also be appreciated that thermosetting resins other than phenolics can be used in producing proppants according to the instant invention, provided only that they have the requisite properties, as indicated above.

It will also be appreciated that the curing procedure described in the foregoing Examples, because of the stirring of the charge during cure and of the interruption of the cure to break clumps was extremely disruptive in the sense that the curing resin was repeatedly disrupted, physically, by the stirring and by the breaking steps, and that the procedures of the Examples were successful because the resins used, despite the disruption during cure, were able to form relatively uniform coatings on individual sand particles. Other resin systems capable of withstanding this type of disruption during cure are known, for example being disclosed in U.S. Pat. No. 3,274,046, granted Sept. 20, 1966, to Shannon and Sullivan. This patent discloses numerous curable novolac compositions containing wetting agents and capable of being forced by the autogenous pressure generated by a blowing agent or blowing agent composition into a mass of intermeshed glass fibers of the type commonly known as glass wool or as glass fiber board. Additional resin systems which can be so used are described in U.S. Pat. Nos. 2,993,871 and 3,081,269, granted July 25, 1961, and Mar. 12, 1963, to Shannon and Sullivan. Other such resin systems will be apparent to those skilled in the art from the disclosure herein.

Accordingly, in its essential details, one embodiment of the invention constitutes a proppant charge which comprises a large number of resin coated particles most of which are single sand particles with a thermoset resin coating thereon where the Conductivity Ratio of the proppant charge, throughout a given closure stress range is greater than that of sand, as shown.

TABLE IX

| CLOSURE STRESS (P.S.I.) | CONDUCTIVITY RATIO OF CURED RESIN COATED SAND (FROM TABLE IV) | CONDUCTIVITY RATIO OF SAND ALONE |
|---|---|---|
| 2,000 | 1.00 | 1.00 |
| 4,000 | 0.88 | 0.92 |
| 6,000 | 0.74 | 0.80 |
| 8,000 | 0.65 | 0.58 |
| 10,000 | 0.57 | 0.29 |
| 12,000 | 0.46 | 0.12 |
| 14,000 | 0.39 | 0.07 | it will be appreciated that substrates other than sand, e.g., glass beads, titania, and the like, can be used to produce a proppant charge according to the invention. Accordingly, in a broad sense, the invention comprises a proppant charge of resin coated particles, most of which are single particles with a thermoset resin coating thereon where the resin is one which, when it constitutes the resin coating on particles of a proppant charge, most of which particles are single sand particles with the thermoset resin coating thereon, produces such a charge where the Conductivity Ratio, throughout a given closure stress range is greater than that of a charge of the uncoated particles of substantially the same particle size distribution.

It has been found that conductivity of proppants determined at different times and, certainly, determined by different laboratories and reported in units such as Darcy-feet, are not consistent. For example, one laboratory has been known to report a conductivity for a given material which differs by a factor of 2, or even more, from that reported by another laboratory for the same material. In addition, as demonstrated above, the conductivity varies substantially when particle size or even proppant loading is changed. However, Conductivity Ratios have been found to be consistent from laboratory to laboratory, and without regard to the time (for example, August v. February) when the determinations are made.

The proportion of the resite or other thermoset resin coating to the particulate substrate in a proppant according to the invention is not critical in the usual sense. In general, even minute proportions of the resite or of another appropriate coating increases the strengths of the proppants, and strength increases as a direct function of an increase in the proportion of the resite or the like. Ordinarily, satisfactory results are achieved when the resite or the like constitutes from about 3 percent to about 8 percent of the coated particulate substrate.

Gamma-aminopropyltriethoxysilane was used in the foregoing Examples as a coupling agent to increase the adhesion between the phenolic resins and the sand substrate. The use of silane and other coupling agents in this manner is highly desirable because of the improved adhesion that is achieved, but is not a novel feature of the instant invention because silane and other coupling agents have been used to improve the adhesion between glass fibers and various resins employed therewith. Although not fully understood, it is bleieved that the —Si—O—Si-linkages which form when silanes are hydrolyzed and condensed are highly compatible with, and adhere well to silica bodies and bodies containing a comparatively high portion of silica, for example, silica sand and glass, while aminoalkyl groups are highly compatible with phenolic resins and, therefore, enable good adherence therewith. Other silanes can also be used as coupling agents, as can, in general, any material having two functional groups, one of which is highly compatible with the particulate substrate and the other of which is highly compatible with the resin to be coated thereon.

The instant invention also provides a method for propping a fractured well. By way of example, if a fractured well having a depth of about 10,000 feet is to be propped, a total of about 19,000 pounds of the pre-cured proppant produced as described in any of the foregoing Examples can be injected as a suspension in a carrier fluid which can be salt water, a hydrocarbon liquid such as diesel oil, or the like, at a concentration of about 2 pounds per gallon. The pre-cured proppant suspension can be injected into the well at a rate of about eight barrels per minute, on the average, and at a surface pressure of about 9,000 p.s.i..

The invention also involves a method for producing a proppant charge, which method comprises the steps of coating a particulate substrate with from about 3 percent to about 8 percent of a thermosettable resin, based upon the total of substrate and resin, and an effective amount of a conventional and known coupling agent, controlling the coating step so that substrate particles coated with the thermosettable resin are produced, curing the resin to a thermoset condition by heating the coated substrate particles, with agitation when necessary, and breaking up agglomerates which may form during the heating, as required, to produce resin coated particles which are composed of substantially a single substrate particle with a thermoset coating thereon.

Although the invention has been described in terms of specific embodiments which are set forth in detail, it should be understood that this is by way of illustration only and that the invention is not necessarily limited thereto, since alternative embodiments and operating techniques will become apparent to those skilled in the art in view of the disclosures. Accordingly, modifications are contemplated which can be made without departing from the spirit of the described invention.

What is claimed and desired to be secured by Letters Patent is:

1. A method for propping a fracture in a subterranean formation which comprises injecting into a subterranean well a suspension in a carrier fluid of a pre-cured proppant charge, said pre-cured proppant charge being pre-cured prior to injection into the subterranean well, said pre-cured proppant charge comprising, prior to injection of the pre-cured proppant charge into said well, resin coated sand particles most of which are composed of a single substrate particle with a thermoset resite coating thereon, the resite coating being one which, when it is the resin coating on sand particles of a proppant charge, produces a charge wherein at least one of: (a) the Conductivity Ratio thereof, throughout a given closure stress range, is greater than that of a charge of the uncoated sand particles having substantially the same particle size distribution; or (b) the Permeability Ratio thereof, throughout the stress range of about 2,000 to 10,000 p.s.i. is at least about 30 percent that of a sintered bauxite charge of substantially the same particle size, the resin for said coating being at least one of: (1) a resole; or (2) a novolac.

* * * * *